Nov. 20, 1956  C. G. MOON  2,771,097
LOOM DRIVE MEANS
Filed Oct. 12, 1953  2 Sheets-Sheet 2
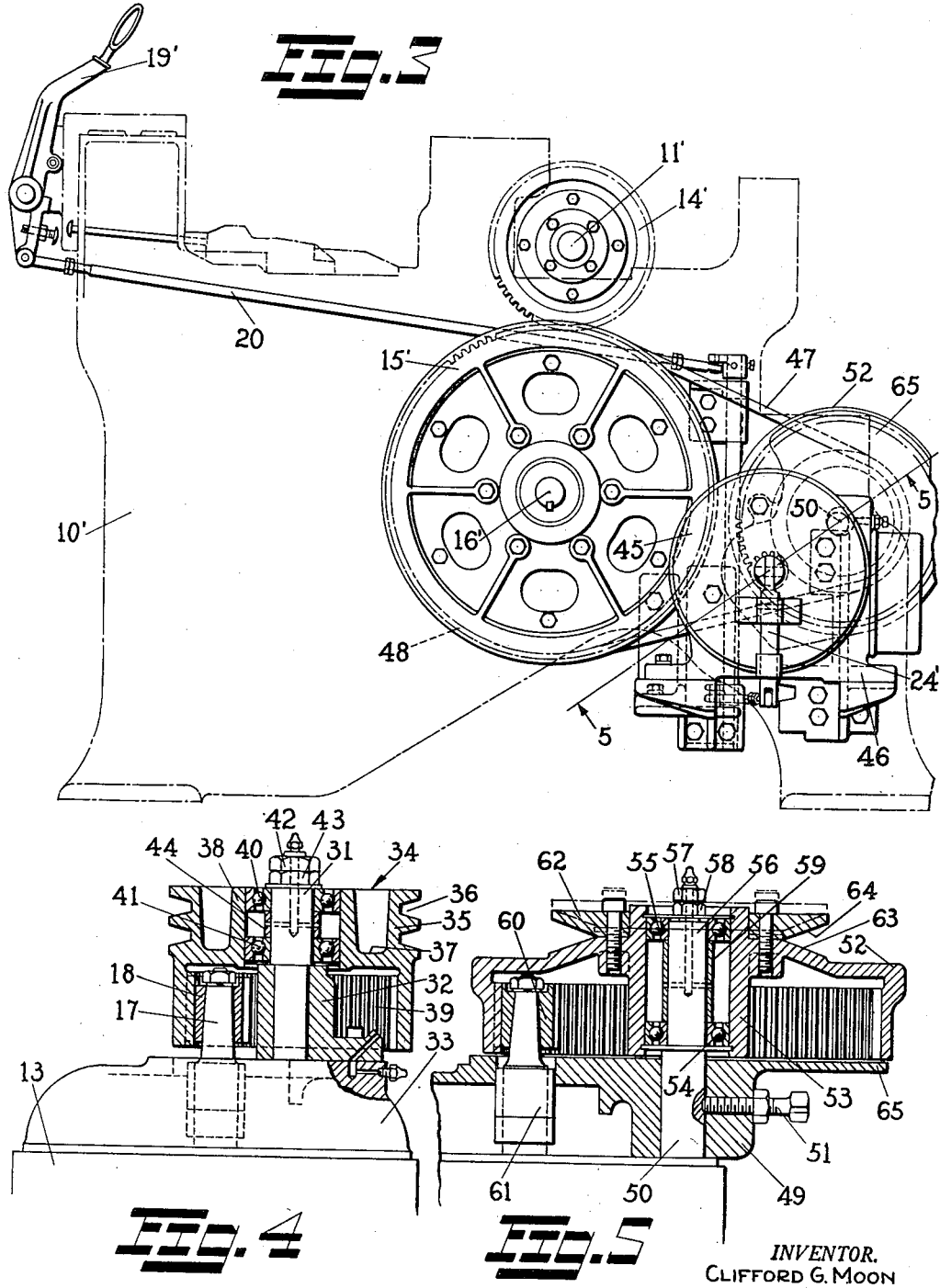
INVENTOR.
CLIFFORD G. MOON
BY
Rodney C. Southworth
ATTORNEY United States Patent Office 2,771,097
Patented Nov. 20, 1956

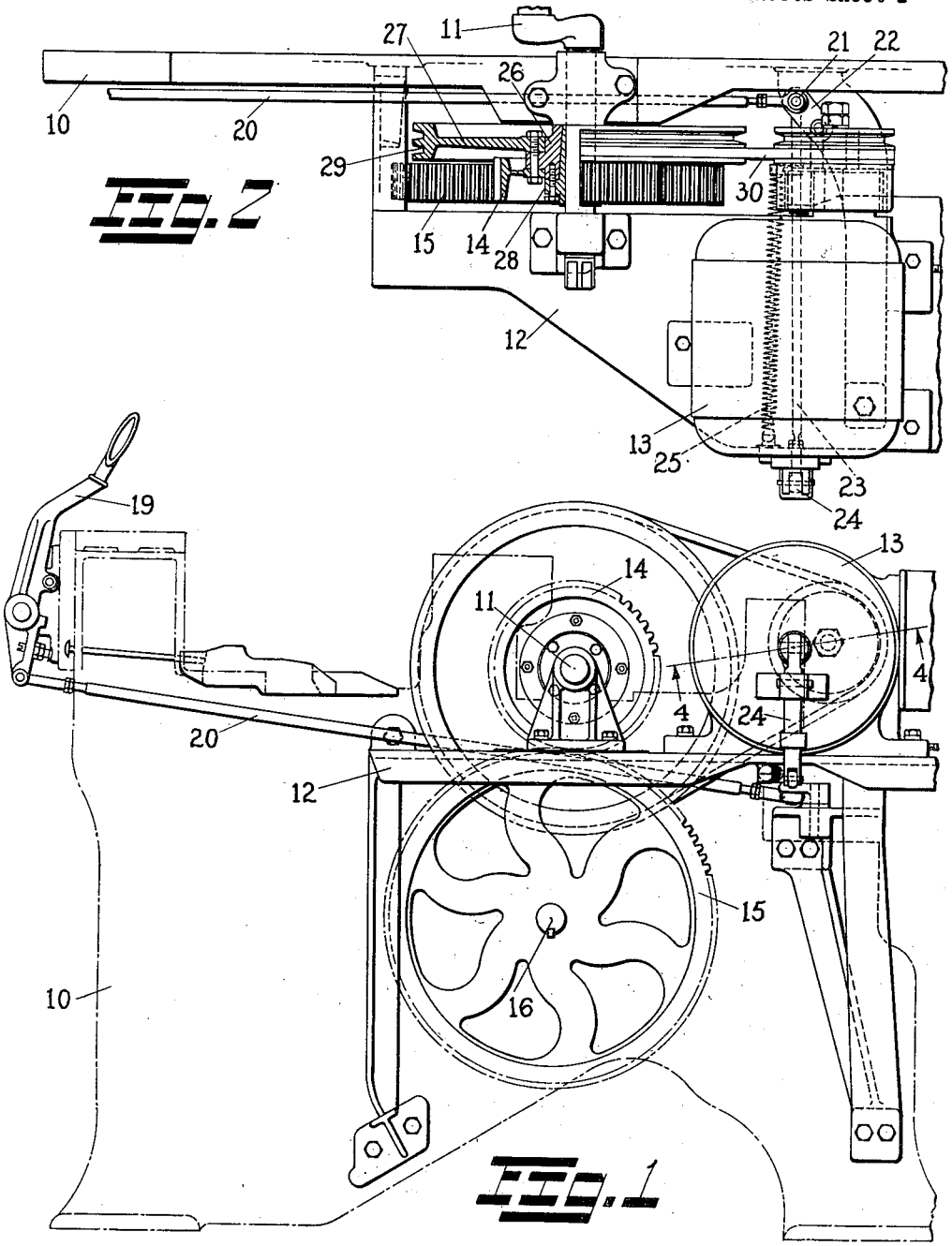

2,771,097

LOOM DRIVE MEANS

Clifford G. Moon, Hopedale, Mass., assignor to Draper Corporation, Hopedale, Mass., a corporation of Maine Application October 12, 1953, Serial No. 385,434

2 Claims. (Cl. 139—1)

This invention relates to driving means for looms especially, to means for driving from a motor or other source of power through a V-belt transmission.

It is a general object of the invention to provide a drive means for a loom which shall employ a V-belt or belts efficiently without resort to a double set of the same and by a simple and inexpensive installation which shall require little attention or upkeep.

It is a further object to devise a drive employing V-belts as efficiently as practicable.

Another object is that of making possible the use of a combined motor, brake and clutch unit driving through a simple gear and V-belt transmission which may be effectively utilized to absorb the shock of picking and braking and thereby reduce wear on the gearing, especially that at the motor itself.

Other objects will become apparent from the following disclosure.

In driving looms an individual power unit is normally provided for each loom and comprises a motor which for efficiency must revolve at a relatively high speed while the loom itself may operate at a speed such that the fastest driven shaft may rotate at no more than 200–220 R. P. M. Thus the transmission, e. g., gearing, belt or other combination, must provide for a considerable reduction. Normally such transmissions comprise gearing in which a clutch is interposed, double sets of V-belt drives or the like. Some newer units such as the Diehl power transmitters comprise a motor having a clutch and brake built in as a unitary part thereof. This unit is then connected to the loom shafting by a reduction gear transmission. Such mechanisms function with several advantages, but are open to one objection, namely, that the shock of picking comes on the same gear teeth and that periodic loads as well as the strain of braking and of "bang-offs" of the loom are not in any way cushioned. V-belts constitute a very inexpensive and effective drive means, also serve admirably to absorb shock and cushion the braking, picking and other destructive tendencies incidental to driving a loom. Since a belt drive must always have some factor of slippage, the shock loads are distributed so they do not occur only at definite phases of motor rotation.

V-belt drives have, however, not been used very widely and have generally involved a double belt reduction due to the rather great speed reduction needed. The designer has been faced with the complications of a double belt system or with extremely large and small pulleys, the latter of which becomes inefficient and requires an excessive number of belts in parallel if the slippage factor is to be kept within reason.

According to the instant invention, a high speed motor, for example, one comprising a motor, clutch and brake unit is further provided with a reduction gear and drive-pulley unit such that a V-belt transmission directly from the motor to the driven loom shaft, either crankshaft or camshaft, may be used. This is accomplished along with the possibility of adequately sized pulleys, both driving and driven, and with a maximum of efficiency for the drive in general.

The reduction gear and drive pulley are preferably rotatable on a stud shaft at the motor and the gearing is of internal type for reasons of compactness and enclosure of the parts.

The invention will be disclosed in greater detail by reference to the accompanying figures of drawing, wherein:

Fig. 1 is a side elevation of parts of a loom to which the invention has been applied.

Fig. 2 is a plan view of the mechanism of Fig. 1.

Fig. 3 is a view similar to Fig. 1, but showing a drive to the loom camshaft rather than the crankshaft.

Fig. 4 is a section taken at line 4—4, Fig. 1.

Fig. 5 is a similar section at line 5—5, Fig. 3.

Now referring to Figs. 1, 2 and 4 a part of a more or less conventional loom including loomside 10 and crankshaft 11, has mounted on side bracket 12, a driving motor 13. The crankshaft is connected by gears 14 and 15 for driving camshaft 16 at one-half the speed of the former.

The motor 13 may be of any suitable type, but as herein described, it is of that class which combines as a unit a rotor carried on bearings in a casing and with which may function a clutch and brake adapted to be selectively applied depending upon whether or not it is desired to drive the loom or to stop it. A neutral position is selectively availed of when it is desired to rotate the loom disconnectedly from the motor. The drive is actually taken off the rotor through a shaft 17 and pinion 18, Fig. 4.

Control is effected by a knock-off lever 19, link 20 connected at 21 to an arm 22 pivoted on bracket 12 and a second link 23 also connected at 21 and at its opposite end to controller lever 24. The latter is, in effect, a part of the motor unit and its operation within the motor is well known to those skilled in this art. A spring 25 normally tends to move the parts to a stopping position. The mechanism described to this point is not new.

At the crankshaft 11 gear 14 is fixed to hub 26 to which a V-belt pulley 27 is also attached. The hub is internally tapered and a split bushing 28, also tapered, is forced into said hub and drawn down to grip the shaft in a known manner. This pulley has two grooves 29 within each of which may engage a V-belt 30. The gear and pulley may be fixed to the shaft in any other convenient manner.

If this V-belt were to be driven from a pulley replacing the pinion 18 at the motor shaft, that pulley would be too small for efficiency, that is, assuming any reasonable size for the pulley 27. According to the invention, a combined reduction gear and drive pulley of more effective size is provided, preferably as a unit which becomes a part of the motor being supported on the end shield thereof. A stud shaft 31 is fixed in a bracket 32 which is in turn bolted to a faced surface on the end shield 33 of the motor, or which may be suitably mounted on any other member to occupy the same relative position. A drum-like rotary member 34 comprises a pulley 35 having grooves 36, and a hub 37 at one side of web 38, and at the other side, an internally toothed gear 39. The hub 38 is carried on bearings 40, 41 clamped on shaft 31 by nuts 42, 43 and spaced by sleeve 44. The pinion 18 meshes with internal gear 39 and drives the latter and, of course, the pulley 35 which becomes a drive pulley and is rotated at one-fourth to one-third the speed of motor shaft 17. Thus the V-belt or belts function on a much larger pulley than would otherwise be the case and the drive involves only two pulleys and, at most, two belts. In fact, most looms can be satisfactorily driven with a single belt of relatively small size, to wit: either a B or C belt.

Now referring to Figs. 3 and 5, a modification adapted to function in driving a loom camshaft will be described. Such a drive connected to the camshaft may be supported on a base or bracket at the loomside or at the rear of the loom and here a motor 45 is supported on bracket 46, this motor preferably being of the same type as that previously described. To an extent, like parts in Fig. 3 are given similar reference characters to those used in Fig. 1, but with primes. The motor positioned at about the plane of the camshaft 16' is adapted to drive that shaft through a belt or belts 47 which engage a V-belt pulley 48 similar to pulley 27, Fig. 2, and which is bolted to gear 15' or otherwise fixed to the camshaft. A crankshaft, provided such is a part of the loom, carries a gear 14' meshing with that on the camshaft and thus is driven from the camshaft, but at twice the speed of that shaft.

Since in the fly shuttle loom the camshaft is rotated at one-half crankshaft speed and it is not practical to reduce the motor speed itself, a larger reduction at the gear unit, Fig. 5, is necessary. In this case a bracket or preferably, a special end shield 49 is utilized to mount a stud shaft 50 held in place by a locking screw 51. An internally toothed gear 52 is rotatable on shaft 50 as its hub 53 is mounted on ball bearings 54, 55, or on other suitable bearing means on a reduced end 56 of the stud shaft. These bearings are clamped on the shaft end by nuts 57, 58, and are held apart by a spacer 59. The hub 53 is retained axially by snap rings or the like. The teeth of gear 52 are in mesh with those of a pinion 60 fixed to the end of motor shaft 61. The number of teeth involved in this reduction may be such as to give a reduction so that the gear makes only one turn for six to eight turns of the pinion. Of course, these figures are given by way of example and the range may extend in either direction according to requirements.

The pulley may be cast integral with the gear 52 as in Fig. 4, but may also be formed by bolting to the hub of the gear a flange 62 to be spaced by a shim or shims. The web of the gear 52 is faced at 63 at an angle appropriate for a standard V-belt as is the opposite surface 64 of the flange. The interposition of shims of different thickness may within limits vary the effective diameter of the pulley so as to regulate loom speed within a narrow range. The modification of this Fig. 5, as shown, is limited to one belt, but, of course, multiple belts may be accommodated by building up more pulley grooves. The belts might better be more widely spaced if that is to be done.

The shaft extension 56 is not only of reduced diameter as compared to the part 50, but is also eccentrically disposed. By loosening screw 51 the shaft may be rotated and the center distance between pinion 60 and gear 52 adjusted to provide proper tooth engagement.

The motor end shield 49 is faced to provide a flat surface adjacent which the internal gear rotates and an extension 65 is built out to complete the closure so the gears may run free from lint and dirt and with grease retained.

Either of these drives functions which only one or at most two V-belts in parallel and the size of pulleys involved in such as to give a good angle of wrap, adequate diameter and not too high rational speed, especially considering the smaller of the two pulleys. The motor and gear reduction unit may be adjusted to and from the driven shaft to tension the belt or belts properly and the drive is admirably adapted for looms since the belt slippage and resilience avoid any association of periodic shock loads with particular gear or pinion teeth and the belts cushion the various shock and other loads such as that at emergency stopping, all of which are peculiar to loom operation.

While the preferred form of the invention is that illustrated and is characterized by internal gearing, it is to be understood that the invention is not limited to that only, but may be practiced with other arrangement of the reduction gears. Of course, other types of driving motor may be employed.

While one embodiment and a modification of the invention have been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In a loom the combination of a loomside, a crankshaft and a camshaft carried in bearings in said loomside, gears interconnecting said crankshaft and camshaft thereby to drive one from the other and means for driving one of said shafts which comprises an electric motor supported at said loomside, said motor having an end shield, a shaft and pinion, a second shaft fixed in said end shield in laterally spaced, parallel relationship to said motor shaft and an internally toothed gear rotatably carried by said second shaft with which said pinion is in mesh, V-belt pulleys, one on that first mentioned driven shaft and a second which forms a part of said internally toothed gear and a V-belt running over said pulleys.

2. Mechanism as defined in claim 1 in which said shaft on which the internally toothed gear is borne is eccentrically formed and adjustable thereby properly to mesh the teeth of said gear and pinion.

References Cited in the file of this patent

UNITED STATES PATENTS

| 2,449,157 | Bahon | Sept. 14, 1948 |
| 2,556,751 | Fumot | June 12, 1951 |

FOREIGN PATENTS

| 8,594 | Great Britain | Apr. 13, 1907 |
| 400,628 | Germany | Aug. 26, 1924 |